Patented Oct. 5, 1943

2,331,266

UNITED STATES PATENT OFFICE 2,331,266

METHOD OF COOKING MEATS

Harold F. Cramer, Denver, Colo.

No Drawing. Application April 22, 1941,
Serial No. 389,749

2 Claims. (Cl. 53—21)

This invention relates to improvements in methods of cooking meats, more particularly steaks.

The methods usually employed in cooking steaks consists either in frying the same in a pan containing some butter or other fat or in broiling the meat over charcoal, or by exposing it to heat from a gas flame. In either one of the above methods, the heat is applied primarily to one surface at a time and the temperature used is quite modest and seldom, if ever, exceeds 600 degrees F.

Since the heat is quite moderate, as above indicated, and since it is applied in its full intensity to one side only, the surface of the meat does not sear and seal with the result that the juices continue to exude during the entire cooking operation leaving the meat dry and rather hard.

The low heat usually employed does not raise the meat to the critical temperature at which the fibers begin to separate and crinkle and therefore the meat is not tenderized by the cooking operation which merely serves to dry and harden the fibers.

It is well understood that if a steak is cooked too long by the usual low temperature methods, it becomes so dry and hard as to be practically unfit for food. Broiled and barbecued meats lose a large amount of their juices if they are cooked until they are well done and it is therefore necessary to serve such meats quite rare in order that they may still retain some of the juices.

It has also been found that tough cuts of meat are not rendered tender by the usual low temperature methods of cooking, but rather become tougher and as a result, the tougher cuts must be subjected to some mechanical tenderizing treatment before they are cooked.

It is the object of this invention to produce a process for cooking meats whereby the juices will be retained in the meat to a much greater extent than is possible with the present low temperature methods.

Another object is to produce a process for cooking meats whereby the entire surface is suddenly subjected to a temperature sufficiently high to sear the outer surface so as to retain the juices within the meat and thus prevent the drying out effect of slow low temperature cooking. A further object is to subject the meat to temperatures sufficiently high to cause the fibers to separate and crinkle, thereby tenderizing the meat and putting it in condition to retain the juices in the inter-fiber interstices.

The improved method of cooking meats to which this invention relates, briefly described, consists in introducing the meats into the interior of a muffle heated to a temperature of at least 1100 degrees F. and retaining it in the heated muffle for a sufficient length of time to thoroughly cook the meat without burning it.

The meat is supported on a grid of highly refractory metal, such as Nichrome, the base of which is as small as practical and spaced apart so as to exposed as much surface as possible to the heat.

The muffle is preferably heated by electrical means and the meat is supported as near as practical at the center of the muffle in order that the heat may act uniformly on all sides at once.

The high temperature (at least 1100 degrees F.) immediately kills any germs or bacteria that may be present on the surface of the meat.

The sudden application of this high temperature (1200 degrees F.) to all sides of the meat sears and seals the outer surface almost instantly, which prevents the loss of the juices and fats. Any steam or gas generated within the meat, due to the action of the heat, is retained and helps to expand the meat and separate the fibers which does not take place when temperatures less than 1100 degrees F. are employed. At the temperature of 1100 degrees F. a change, clearly visible to the naked eye, takes place, the grain or the fibers begin to loosen, and the fibers begin to crinkle, thereby breaking up the heretofore compact fiber bundles and allowing the juices to enter the minute spaces thus formed. 1100 degrees F. seems to be a critical temperature for the purpose of tenderizing, as at this point a decided structural change takes place that causes tough cuts of meat to become tender and palatable.

Although a marked change is apparent when the temperature used is 1100 degrees F. this temperature is not quite high enough to produce the sealing effect desired and some of the juices are still exuded, although to a very small degree, compared to that which occurs at temperatures as low as 600 degrees F. When the temperature of the muffle is raised to 1200 degrees F. before the meat is introduced, the surface seals tight and the juices are prevented almost entirely from escaping. If a break does occur, the juices that escape are immediately dried up by the heat and seal the break. The flavor is now richer and the meat more tender than when cooked at 1100 degrees F. A temperature of 1300 degrees F. does not produce any additional appreciable change in the flavor or tenderness. As the temperature is increased above 1300 degrees F. the flavor continues to increase in richness and the meat in tenderness until the temperature of 1800 degrees F. is reached. Above this temperature no appreciable improvement in flavor and tenderness is observed. Since temperature higher than 1800 degrees F. are hard to attain and maintain, this is believed to be the practical upper limit.

The following are the results obtained by a test using in each instance steak cut from the same piece and as nearly alike as possible. The temperatures indicated are those of an electrically heated muffle into which the meat was introduced resting on an open grid, the meat was positioned as near the center of the muffle as practical and entirely out of contact with the walls thereof.

Tests

*500 degrees F.*—Juices exuded freely while cooking and result was very dry and tough. (N. B. Fibrous structure was tightly packed.)

*750 degrees F.*—Juices still exuded freely while cooking and result was slightly juicier but equally tough. (N. B. Fibrous structure was tightly packed.)

*1000 degrees F.*—Juices still exuded freely while cooking and result was same as at 750 degrees F.

*1100 degrees F.*—Juices exuded less freely while cooking and result was much juicier. (N. B. Fibrous structure begins to loosen and the grains begin to "crinkle" giving the characteristic appearance of high temperature cooked meat.)

*1200 degrees F.*—Juices are sealed in and do not exude while cooking. Flavor is richer and meat begins to be more tender.

*1300 degrees F.*—Approximately same as at 1200 degrees F.

*1400 degrees F.*—Flavor is changed and very rich. Meat very tender.

*1600 degrees F.*—Improved in degree over that cooked at 1400 degrees F.

*1800 degrees F.*—Again improved in tenderness over meat cooked at 1600 degrees F.

*2000 degrees F.*—Same as at 1800 degrees F.

*2200 degrees F.*—Same as 2000 degrees F.

It will be observed from the above that somewhere between 1000 and 1100 degrees F. a decided structural change took place which was increased in degree as the temperature increased to 1800 degrees F.

The sealing of the outer surface became effective somewhere between 1100 and 1200 degrees F.

The tests described above show that no marked difference in results occurred until the temperature reached 1100 degrees F. when a marked difference in appearance and tenderness was observed. At 1200 degrees F. the surface sealed completely and the results of temperature above 1200 degrees F. merely improved the tenderness and flavor.

From the tests, the results of which have been set out above, it is apparent that a temperature of slightly below 1100 degrees F. is critical from the point of tenderness and that a temperature of 1200 degrees is critical from the point of juiciness.

It is pointed out at this time that the effect of the increased temperature is not merely to decrease the time necessary to cook the meat, but, in addition to this it effects a physical change which becomes very marked at 1100 degrees F. The exact point at which the separation and crinkling of the fibers begins is difficult to determine, but it was observed that when the temperature of the muffle was 1000 degrees F. this change had not taken place, whereas, when the meat was cooked at a temperature of 1100 degrees F. the change in structure was clearly apparent. The temperature of 1100 degrees F. is therefore considered as representing in a practical way the critical temperature for tenderness and the temperature of 1200 degrees F. the critical temperature for juiciness.

The time required for cooking depends on the temperature and to some extent on the thickness of the steak or other meat and with a steak of ordinary thickness and a temperature of 1200 degrees F. and over, the time required is less than sixty seconds; with higher temperatures, the time may be decreased to thirty seconds or less.

This application is a continuation in part of application Serial No. 362,075, filed October 21, 1940, now Patent No. 2,274,190, issued February 24, 1942.

Having described the invention, what is claimed as new is:

1. The method of cooking a steak which comprises subjecting substantially the entire outer surface thereof to the sudden application of a temperature of at least approximately 1100° F. for a sufficient time to cook the steak substantially through to the center, said steak being of such thickness that cooking through substantially to the center is produced before substantial charring of the surface takes place.

2. The method of cooking a steak which comprises subjecting substantially the entire outer surface thereof to the sudden application of a temperature of at least approximately 1200° F. for a sufficient time to cook the steak substantially through to the center, said steak being of such thickness that cooking through substantially to the center is produced before substantial charring of the surface takes place.

HAROLD F. CRAMER.